United States Patent [19]
Hilgendorf

[11] 3,916,284

[45] Oct. 28, 1975

[54] POLYPHASE ALTERNATOR WITH SINGLE PHASE OUTPUT

[75] Inventor: Walter P. Hilgendorf, Colorado Springs, Colo.

[73] Assignee: Outdoor Energy Products, Inc., Colorado Springs, Colo.

[22] Filed: June 13, 1974

[21] Appl. No.: 478,870

[52] U.S. Cl. .................. 321/7; 290/40; 321/60; 322/77
[51] Int. Cl.² .................. H02M 5/02; F02B 63/04
[58] Field of Search .......... 318/171, 231; 321/7, 60, 321/61, 63, 64, 65, 66, 69 R; 322/77; 290/40 R

[56] References Cited
UNITED STATES PATENTS

| | | | |
|---|---|---|---|
| 2,968,758 | 1/1961 | Ludbrook | 321/64 |
| 3,089,992 | 5/1963 | Seney | 321/60 |
| 3,164,765 | 1/1965 | Burson | 322/77 |
| 3,369,168 | 2/1968 | Maust et al. | 321/60 |
| 3,539,900 | 11/1970 | Chausse et al. | 321/7 |
| 3,663,945 | 5/1972 | Hughes et al. | 321/61 |
| 3,803,478 | 4/1974 | Honey | 321/7 |

*Primary Examiner*—William H. Beha, Jr.
*Attorney, Agent, or Firm*—Richard W. Hanes

[57] ABSTRACT

An alternating current electrical power generator of the rotating field type whose output frequency is independent of the rotational speed of the field. Low frequency electrical power is produced by generating a high frequency polyphase voltage which is rectified alternately positive and negative and by simultaneously modulating the level of the high frequency voltage with a low frequency sine wave.

6 Claims, 8 Drawing Figures

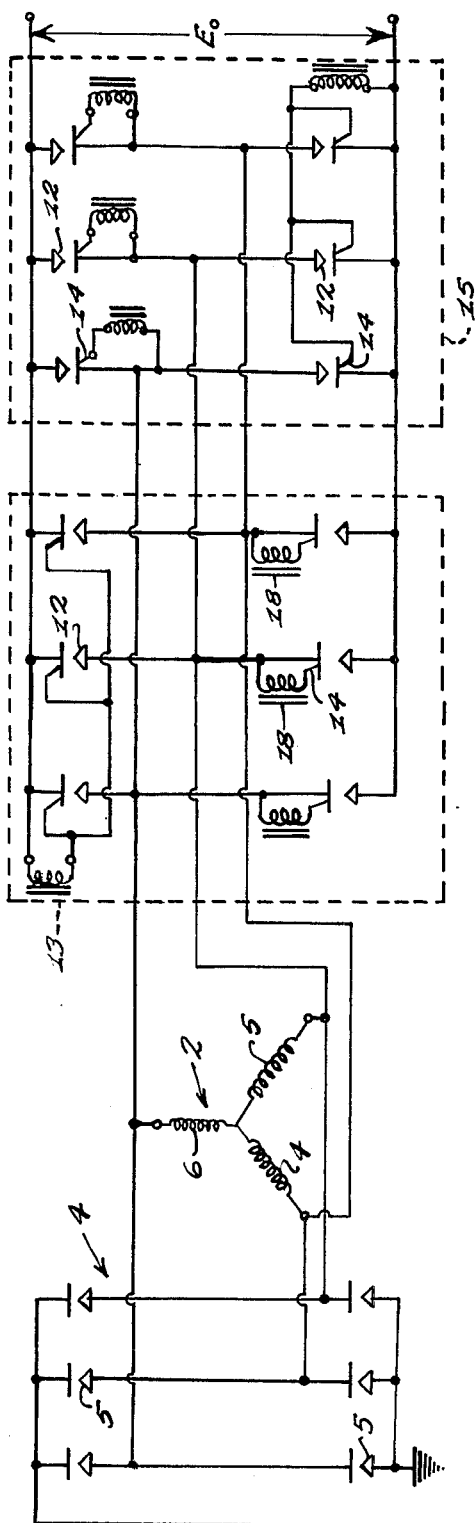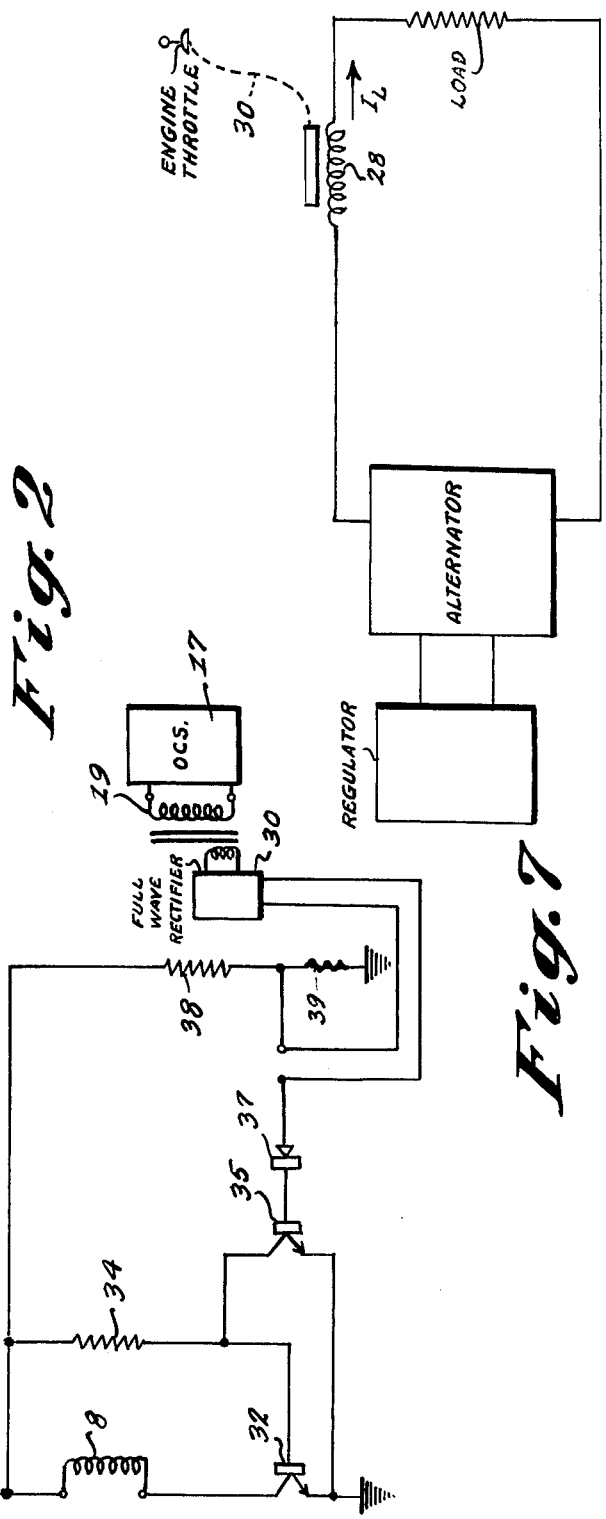
Fig. 2
Fig. 1

POLYPHASE ALTERNATOR WITH SINGLE PHASE OUTPUT

Small portable electric power generators driven by low horsepower engines are conventionally all of similar specifications and design because of certain inherent design limitations existent in the state of the art. For example, portable alternators of the 115 volt 60 hertz type are normally single phase stator wound with a two-pole rotor revolving at constant synchronous speed of 3600 rpm. Such a device will produce power of the desired 60 hertz frequency if the shaft speed is held constant. However, from a practical standpoint, small engines cannot economically be governed to maintain the desired speed. Consequently, the lower shaft speed encountered under load produces lower electrical frequency, resulting in the overheating of electrical equipment operating from the power source.

Moreover, in a portable device, there is usually little occasion for threephase balanced loads, thus confining the alternators to single phase windings, a less efficient arrangement than a polyphase winding.

Thus, it is the primary object of the present invention to overcome the disadvantages of the conventional single phase alternator on small portable power plants and to advantageously combine the benefits of high frequency power generation with polyphase windings to produce a small, light-weight and efficient portable electric power generator.

A basic object of the invention is to provide an electrical alternator primarily for use with portable engine driven power plants where the frequency of the alternating output voltage is independent of engine shaft speed.

A further object of the invention is to provide a portable electric alternator having a high power output to weight ratio.

These and other objects and advantages will become apparent upon a reading of the following description of a preferred form of the invention taken in connection with the accompanying drawings in which:

FIG. 2 is a schematic diagram of a preferred form of the alternator of the present invention.

FIG. 7 is a block diagram of the alternator of the present invention showing the speed control system for the prime mover.

The alternator of the present invention includes a polyphase armature winding and a self-excited field winding which are caused to rotate, one with respect to the other, so the magnetic flux created by the field winding is cut by the coils of the armature windings to produce a voltage output in a manner well known to the art of electrical power generation.

To achieve the desired independence from synchronous speed, there are provided within the speed range of the prime mover an alternating output voltage in the armature of from 400 to 600 hertz, although such range is not critical, nor is it intended to be set forth as limiting, especially at the higher end. This high frequency output of the armature is processed by additional steps to produce the final output wave form of the desired frequency, for example, 60 hertz.

The alternator includes means for generating a DC exitation voltage, and further includes a voltage regulator which is utilized in a novel manner to eliminate the unwanted odd harmonics from the alternator output.

Figure 1:
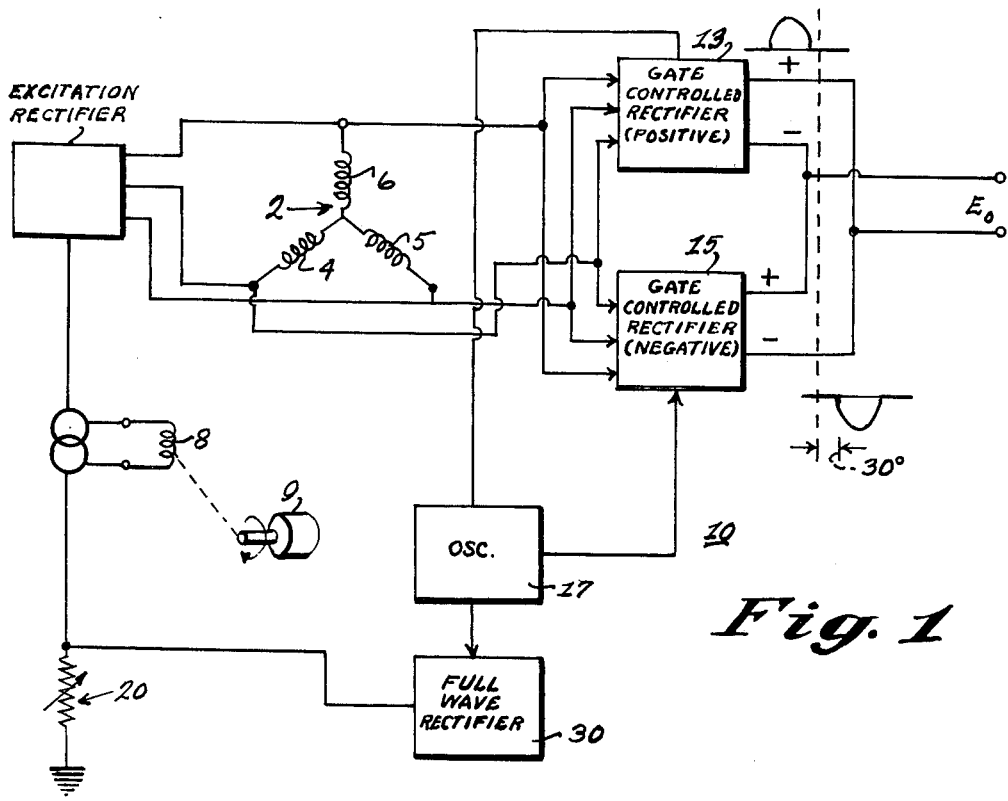
FIG. 1 is a block diagram of the alternator of the present invention.

The invention may best be understood by reference to the block diagram of FIG. 1, as explanatory of the general concept of the generation and development of the output wave form, and then to the schematic of FIG. 2 for a more detailed explanation of a preferred form of the alternator, one having a 60 hertz regulated output and an internal frequency of 480 hertz.

Referring now to FIG. 1, the polyphase armature windings of the alternator 10 are indicated generally by reference numeral 2 and, in this example, consist of three windings 4, 5 and 6 interconnected in the familiar three-phase "V" connection. (A "delta" connection could also be employed.) A pole field winding 8 is shown in this illustration as being disposed in the rotor of the alternator, the same being mechanically connected to the rotatable output shaft of a prime mover 9, such as an internal combustion engine. A sixteen pole rotor is provided for generation of an alternating three-phase output voltage of 480 hertz.

Figure 3:
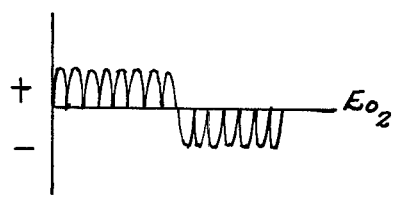
FIG. 3 is a pictorial diagram of the alternate positive and negative pulse trains present at the output of the pair of gate controlled recitifiers without reference to any commutation period.

As a first step in developing the desired low frequency output voltage (for example, 60 hertz), the output of the polyphase armature winding 2 is applied to a pair of inversely arranged and parallel connected gate controlled rectifiers 13 and 15. The "inverse" arrangement contemplates that the positive output of one rectifier 13 is connected to the negative output of the other 15 and vice versa. Depending on which of the said two rectifiers is "on", the output consists of either full wave rectified DC pulses on the positive side of the zero voltage reference line, or DC pulses on the negative side of the reference line. (See FIG. 3)

Each of the gate controlled rectifiers 13 and 15 is of the full wave type and employ any one of several possible types of diode devices which are well known to the prior art.

Figure 3A:
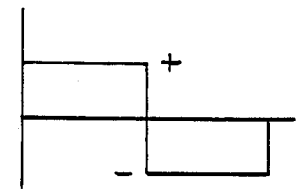
FIG. 3a is a square wave diagram of the voltage output shown in FIG. 3.

If the rectifiers are alternately turned on and off by an external control, the output $E_{o2}$ becomes a series of positive and negative pulse trains where the pulses are those produced from full wave rectification of three phase voltage of 480 hertz. Even without a filter at the output, the ripple factor in both the positive and negative pulse trains is very low, allowing the pulse train to be represented as a square wave, as shown in FIG. 3a.

Each of the gate controlled rectifiers is turned "on" by the application of an alternating control voltage having the same frequency as that of the desired alternator output voltage. If, for example, a 60 hertz output frequency is anticipated, a control voltage of that frequency is generated by an oscillator 17 whose output is directed to the gating elements of the diodes 12 comprising the rectifiers 13 and 15. As the control voltage goes positive, the "positive" rectifier 13 turns on and a series of rectified pulses appear at the output whose effective voltage is representative of a square wave. Similarly, when the control voltage from the oscillator 17 goes negative, a negative square wave is produced at the output. If there was no time spacing between the positive conduction of the two rectifiers, the output voltage wave would contain the fundamental of the control voltage plus an infinite number of odd harmonics. (FIG. 3a)

Figure 4:
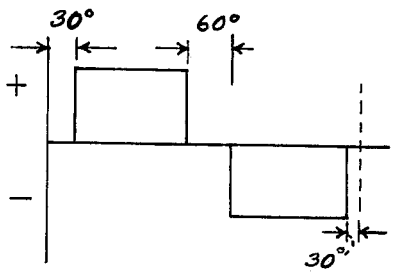
FIG. 4 is a wave shaped diagram similar to that of FIG. 3a, but taking into consideration the commutation period of 30° at the beginning and end of each half-cycle.
Figure 5:
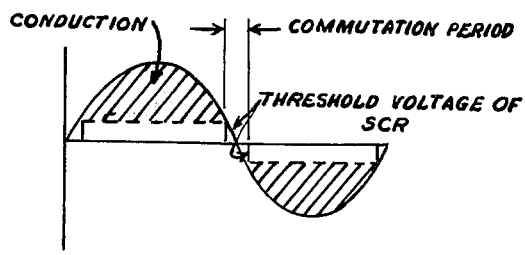
FIG. 5 is an illustration of the control voltage wave shape showing the threshold voltage of the gate controlled recitifier diodes which establish the commutation period.

The ultimate object is to purify the square wave and eliminate, as far as possible, all harmonics leaving only the fundamental frequency. To this end, it is expedient to arrange the gate control voltage on each rectifier so that the rectifier is turned on at about 30° into the half-cycle and is turned off at 30° before the end of the half-cycle, the conduction period being from about 30° to 150° and from 210° to 330°. Providing for a commutating period of 30° at the beginning and at the end of each half-cycle produces a wave shape having substantially all of the third harmonic removed and being essentially similar to the one shown in FIG. 4. The control voltage wave shape is illustrated in FIG. 5.

Figure 6:
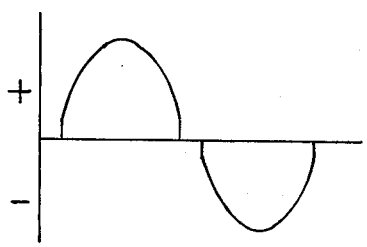
FIG. 6 is a pictorial diagram of the wave shape of the alternator output.

In order to understand the method of removal of the remaining odd harmonics, reference is made to the voltage regulator 20. Regulators generally are well known devices for maintaining the level of the alternator output voltage and may be of several different forms. The regulator 20 illustrated in the diagram of FIG. 1 is essentially a variable resistance in series with the pole field excitation circuit. As the amount of resistance is varied, the pole field exitation is modulated accordingly, thus modifying the level of the armature voltage output. In order to eliminate the odd harmonics from the alternator output, voltage is injected into the regulator which acts to modulate the output and give the desired shape to the wave form. The modulating voltage is the rectified output of the control voltage. Thus, as each half-cycle pulse from the control voltage rectifier 30 is applied to the regulator 20, the armature output imitates the sinusoidal wave shape of the modulating voltage and the wave shape of FIG. 4 is modified to the wave shape of FIG. 6, a substantially complete sine wave.

A more detailed schematic diagram of a preferred form of the invention is shown in FIG. 2. The armature windings 2 and pole field winding 8 are the same as those shown and described with respect to FIG. 1.

Rectifiers 13 and 15 are displayed inside the respective dashed lines with those reference numerals. The rectifiers 13 and 15 are shown utilizing a silicon controlled rectifier 12 as the diode. Connections between the three-phase windings 4, 5 and 6 and the diodes are conventional, however, it should be pointed out that the rectifier 15 is inverted relative to the rectifier 13, as explained earlier in connection with the diagram of FIG. 1. The control element 14 of each of the SCRs is connected to a secondary 18 of an output transformer 19 in the control voltage oscillator 17 to provide the gate voltage.

An excitation voltage rectifier 4 comprises six diodes 5 interconnected as a three-phase full wave bridge. The DC output voltage of the rectifier is connected to the pole field winding 8 through a pair of slip rings and to a regulator control transistor 32 which is biased by a resistor 34 to be normally conducting. Connected in parallel with the control transistor 32 is a second transistor 35 whose base voltage is controlled by a voltage divider 38, 39 and a zener diode 37 whose zener voltage is identical to the pole field voltage to be maintained for a given voltage output. In a manner well known in the art, the firing or conduction of the zener diode 37 is operative to apply a bias to the base of the second transistor 35, causing it to conduct and draw current through the biasing resistor 34, thus changing the voltage on the base of control transistor 32, turning it off and stopping conduction through the pole field winding 4 until the excitation voltage comes back into required limits.

To achieve the wave shaping function of the present invention, the output of the full wave rectifier 30 is applied in series with the zener diode 37. As the rectifier 30 output varies the regulator follows, producing an excitation voltage in the field winding which resembles the output waveform of the full wave rectifier.

The diagram of FIG. 7 illustrates a preferred method and apparatus for controlling the speed of the prime mover responsive to load current. As the load current $I_L$ increases or decreases, the solenoid of electromagnet 28 is moved and through a mechanical linkage 30 to the engine throttle, the speed of the engine is changed to accommodate the load, thus saving fuel and engine wear and reducing noise.

I claim:

1. An electrical power generator including in combination:
    an armature comprising a plurality of polyphase connected electromagnetic coils;
    a plurality of rotatable field poles disposed in flux cutting proximity to the said armature coils and including a field winding;
    a prime mover operably connected to the field poles;
    a pair of mutually inverted polyphase gate controlled rectifiers interconnected in parallel and each respectively connected to the armature coil and each including control gate means;
    a source of alternating control voltage having an output connected to the control gate means;
    a source of excitation voltage connected to the said field winding;
    a full wave rectifier connected to the output of the said source of alternating control voltage; and
    means interconnecting the full wave rectifier and the field coil and responsive to the unfiltered output of the full wave rectifier to modulate the field winding exitation voltage.

2. The combination of claim 1 wherein the source of excitation voltage includes:
    an alternating current rectifier; and
    means interconnecting the said alternating current rectifier to the said armature coils.

3. The combination of claim 2 wherein the means interconnecting the full wave rectifier and the field coils includes a voltage regulator responsive to the output of the said alternating current rectifier.

4. The combination of claim 3 wherein each of said polyphase gate controlled rectifiers includes a plurality of gate controlled diodes interconnected as a full wave bridge.

5. The combination of claim 4 and further including servo-mechanism means connected to the prime mover for speed control thereof and responsive to load current from the output of the said gate controlled rectifiers.

6. A method of generating low frequency (f) alternating electrical power, including the steps of:

generating high frequency alternating polyphase voltage of frequency of at least 4f, sinusoidally modulating the level of the high frequency polyphase voltage output at the said low frequency rate, rectifying the modulated high frequency polyphase voltage alternately positively and negatively at the low frequency rate wherein the positive half cycle of rectification produces full wave rectified D.C. pulses on the positive side of a zero voltage reference and the negative half cycle produces half wave rectified D.C. pulses on the negative side of the zero voltage reference, and providing a zero voltage commutation period of approximately 30° at the beginning and end of each low frequency half cycle.

* * * * *